Patented Aug. 3, 1937

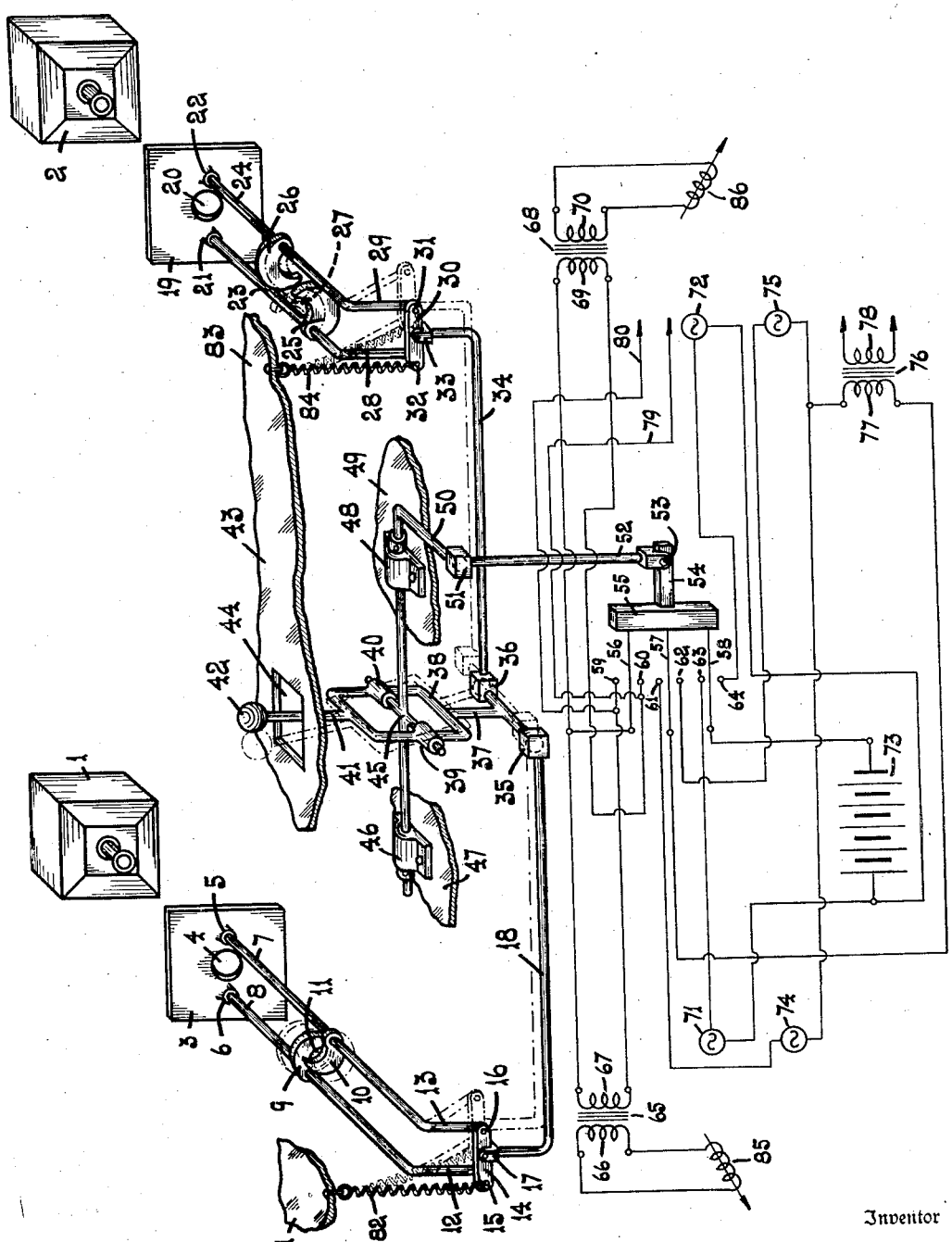

2,088,574

UNITED STATES PATENT OFFICE 2,088,574

CHANGE-OVER APPARATUS

Ilo M. Brown, Shenandoah, Iowa

Application December 14, 1935, Serial No. 54,498

12 Claims. (Cl. 88—16.2)

This invention relates generally to the art of motion picture projection and photography, and more particularly to systems for transferring from one projector or camera to another in the course of the projection or photography of motion pictures consisting of a plurality of reels or sections, without the necessity of interrupting the continuity of the picture.

The invention is adaptable to both the photography and recording of motion pictures and sound, and the projection and reproduction thereof, although it is particularly suited to the projection of sound motion pictures, as it provides means whereby both the projection and sound can be changed from one machine to another, positively and accurately.

One of the objects of the invention is to provide a manual changeover mechanism that adapts itself to simple and easy operation, permitting the operator to change quickly from one machine to another, or, if desired, permitting gradual fade-out of one machine and correspondingly gradual fade-in of another.

Another object is to provide a changeover device for electrical sound equipment used in conjunction with motion picture machines, such device being operated in conjunction with the aforesaid picture changeover mechanism, either simultaneously therewith, or independently thereof.

Another object is to provide a suitable shutter mechanism for use in motion picture photography and projection.

Still another object is to provide a single manual control for both the changeover of the picture projecting or photographing means and for the changeover of the electrical sound equipment, enabling an operator to control such apparatus with a minimum of time and effort.

The illustration shows a view in perspective of the picture changeover portion of the invention, as well as the mechanical portion of the electrical switching mechanism for the sound changeover, and includes a circuit diagram which illustrates a means of switching the electrical sound devices.

In the illustration, 1 and 2 represent motion picture projectors or cameras, focused or directed upon an identical screen or object. 3 and 19 are frames supporting shafts 7 and 8, and 23 and 24 respectively, and in actual motion picture projection, consist usually of the wall of the operating room. In the drawing, for the sake of clarity and simplicity of illustration, the projecting machines 1 and 2 are shown on the opposite side of the wall of the operating room from the changeover mechanism. In actual practice, however, it is usually desirable that the changeover mechanism be in the same room with the projectors, although of course it is not necessary. 4 and 20 are circular apertures to allow the passage of light from the projectors or cameras 1 and 2 to the screen or objective, which is not shown in the figure. Shafts 7 and 8 are journaled in the frame 3 at 5 and 6 respectively, and upon these shafts are secured shutter sections 9 and 10, which rotate therewith. Similarly, shafts 23 and 24 are journaled in frame 19 at 21 and 22 respectively, and upon them are secured shutter sections 25 and 26, which also rotate in accordance therewith. These shutters are disposed, as shown, diametrically about the apertures 4 and 20, and consist of thin plates having curvilinear outlines, the inner edges of which are of the same curvature as apertures 4 and 20, and the inner edge of each shutter comprises slightly more than a semicircle. Rotation of shafts 7 and 8 in the same direction will cause shutters 9 and 10 to move in opposite directions, thereby changing the size of the aperture designated by 11. In a similar manner, rotation of shafts 23 and 24 will cause movement of shutters 25 and 26 in opposite directions, also varying the size of the aperture 27.

Levers 12 and 13 are extensions of shafts 7 and 8, bent at approximately right angles thereto, and are joined pivotally at their extremities by arm 14 at points 15 and 16. In like manner levers 28 and 29 extend downward from shafts 23 and 24, and are connected pivotally by arm 30 at points 31 and 32. Connecting rod 18 is pivoted centrally to arm 14 at 17, and is affixed to the moving frame 37 by means of ball and socket joint 35. Connecting rod 34 is likewise pivoted centrally to arm 30 at 33, and attached to moving frame arm 37 at ball and socket joint 36. The moving frame 37—38, to which are attached arm 41 and manual knob 42, moves rotatably upon cross-piece 45 and is journaled at points 39 and 40. Cross-piece 45 is supported and journaled on frame sections 47 and 49 through bearings 46 and 48.

Lever 50 is a continuation of cross-piece 45, at approximately right angles thereto, and to its outer extremity connecting rod 52 is attached through socket bearing 51. Rod 52 is connected pivotally to arm 54 at point 53. Arm 54 is affixed to switch member 55 to which are attached moving contacts 56, 57, and 58.

Spring 82 is affixed to point 15 on arm 14 and to frame piece 81; similarly, spring 84 is attached to point 32 on arm 30 and to continuation 83 of frame piece 43. 44 is an aperture, preferably square, as shown, limiting the movement of handle 41 and knob 42 in both directions of movement.

Considering the operation of the mechanism as so far described, the purpose of the system is specifically to control the movement of the shutter plates 9 and 10, and 25 and 26, simultaneously, so that when the arm 41 is moved to the left, as shown by the dotted lines of the figure, the connecting rods 18 and 34, and the arms 14 and 30 are displaced to the right, thereby rotating the shutters. In this position the shutters 9 and 10 rotate away from each other, leaving an aperture 11 of the same size as aperture 4, whereas shutters 25 and 26 move toward each other, and effectively block the aperture 27 and the flow of light from aperture 20. The central position of the device is shown in the solid lines in the drawing, and in this position, of course, light would be admitted slightly through both apertures 11 and 27. If the lever 41 and knob 42 were displaced to the right (not shown in the drawing), the shutters 9 and 10 would then move toward each other, blocking the passage of light from aperture 4, while the shutters 25 and 26 would move apart, permitting the flow of light from aperture 20. The movement of arm 41, knob 42, and frame 37, corresponding to this shifting of the shutter positions, is of course about the arm of the cross-piece 45 which is journaled in bearings 39 and 40, and is in the direction of bearings 46 and 48. Springs 82 and 84 serve to maintain the shutters in a position where one is completely open and the other entirely closed, as in such position the tension occurring in the central position shown in solid lines in the drawing is somewhat relieved, as shown by the dotted lines.

Further movement of the frame 38, with arm 37, and arm 41 and knob 42, is provided at right angles to the aforesaid movement, and in this case the frame 38, the arms 18 and 34, and the cross-piece 45 rotate in journals 46 and 48. Arm 50 necessarily rotates therewith, either raising or depressing connecting rod 52 and switch 55, as the knob 42 is moved forward or backward along the plane of moving frame 38, about journals 46 and 48. The two pivotal segments, 17 and 33, are so constructed to permit rods 18 and 34 to rotate slightly therein when the arm 41 is moved in this direction.

As the switch lever 54 and switch member 55 are raised by the aforesaid rotation, contacts 56 and 59 are joined, thereby short-circuiting the secondary 67 of transformer 65, the primary 66 of which is connected to the photoelectric cell or other electrical pick-up 85 of projector or camera 1. This leaves the secondary 69 of transformer 68 in the circuit of conductors 79 and 80, which are directed to the single amplifying system used in conjunction with both machines. Primary 70 of transformer 68 is connected to the electrical pick-up 86 of projector or camera 2. On the other hand, when the switch member 55 is depressed, the contact between 56 and 60 is made, thereby short-circuiting the secondary 69 and placing secondary 67 in the output circuit 79 and 80 leading to the amplifier.

71 and 72 are light sources which supply light for use with the photoelectric cells which are utilized in connection with the primary circuits 66 and 70, not shown in the drawing. Consequently, it will be seen that as contacts 58 and 63 are brought together due to the elevation of member 55, the source 71 will be connected to the battery 73, while the source 72 will be disconnected. When the switch member 55 is depressed, the contacts 58 and 64 will be brought together, disconnecting source 71 from the battery 73 and connecting source 72. As the operation of the photoelectrical pick-up equipment of each projector or camera is dependent upon its individual light source, it will be seen that a raising or depressing of the switch 55 will cause a changeover from one electrical pick-up to the other. It may not, in actual practice, be desirable to utilize both the changeover of the light sources and of the input transformers 65 and 68, and either may be dispensed with if such course proves desirable.

A further changeover of the pilot lamps 74 and 75 is shown, wherein if the switch member 55 is raised, contacts 57 and 61 are joined, connecting lamp 74 in the circuit of the secondary 77 of the power supply transformer 76, the primary 78 of which is connected to a power supply (not shown). When the member 55 is depressed, however, the contacts 57 and 62 are then joined, connecting lamp 75 into the aforesaid secondary circuit 77, and disconnecting lamp 74, the system thereby informing the operator of the position of the switch and as to which branch of the electrical pick-up is operating.

The actual movement of the switch member 55 and associated equipment is not illustrated, but it is believed to be apparent from the foregoing description.

I am aware that the use of revolving shutters is old and well-known in the art, as is the switching of the electrical circuits in connection with motion picture machines, and they are to be considered as being used in my invention only in combination with the means illustrated for their control and movement, and for their combined movement in conjunction with the changeover of both the sound and light projecting and receiving equipment of the two machines.

The invention described is shown in slightly exaggerated form in the illustration for the sake of clarity, and could be reduced to more compact form without departing from its principles or operation. It is, of course, also subject to modifications in form and arrangement without abandoning its spirit and scope. The extent to which I believe my invention to be new and useful is fully set out and denoted in the appended claims.

I claim:

1. In a shutter system, a plurality of shutter plates disposed about an aperture in a frame, and adaptable to an open and closed position, means for causing said plates to rotate including shafts secured to each of said plates and fixed rotatably to said frame, a lever attached radially to each of said shafts, connecting bars pivotally joining said levers, a pivoted manual control lever, a connecting rod joining said manual control lever and said connecting bars, and means for maintaining said plates in a closed position comprising a spring attached to said frame and to said connecting bars so that its tension is reduced with said shutter plates in a closed position, and including identical means for maintaining said plates in an open position.

2. In a device of the class described, a frame section containing an aperture, shutter means supported over said aperture comprising complemental shutter sections adapted when moved together to close said aperture, and adapted to recede simultaneously from the closing position to open said aperture, means for actuating said shutter sections to open and closed positions, said means including shafts secured to said shutter sections, pivoted in said frame section, a lever attached to each of said shafts radially and substantially parallel to each other, means for pivotally connecting said levers, a pivoted manual control arm, means for connecting said manual control arm and said means for connecting said levers, so that movement of said manual control arm is transferred to said connecting means for said levers, and means for limiting the motion of said manual control arm, said means comprising an aperture in said frame disposed about said manual control arm.

3. In a motion picture changeover system, a pair of separate motion picture machines, each having a sound reproducing device, a frame having an aperture corresponding to each machine, shafts mounted on said frame to revolve on axes diametrically disposed about each of said apertures, shutter sections adapted to overlap each other and close each of said apertures, movable to positions not closing said apertures, secured to said shafts, levers attached to said shafts radially, and substantially parallel to each other, connecting arms pivoted to said levers, and joined pivotally in such a manner that when one of said apertures is open the other is closed by said shutter sections, a manual control lever pivoted to allow motion in every direction, means for connecting said manual control lever and said connecting rods, so that movement of said manual control lever in one direction is transferred to said connecting rods to actuate said shutter sections, a switch for effecting a changeover from the sound reproducing device of one of said machines to the sound reproducing device of the other of said machines, and means for controlling the position of said switch by the movement of said manual control lever in another direction.

4. A system as described in claim 3, in which said means for controlling the position of said switch by the movement of said manual control lever in another direction comprises a shaft rotated by said manual arm on an axis of its pivotal motion which is substantially parallel to the direction of its movement in controlling said shutter sections aforesaid, a lever radially disposed on said shaft, and a rod pivotally connecting said lever and said switch.

5. A system as described in claim 3, including means for limiting the motion of said manual arm in every direction, comprising an aperture in said frame disposed about said manual control lever.

6. In combination, in a device of the class described, a pair of separate motion picture machines, each having an optical system, a frame having an aperture corresponding to each of said optical systems, shafts mounted on said frame to revolve on axes diametrically disposed about each of said apertures, shutter sections adapted to overlap each other and close each of said apertures, movable to positions not closing said apertures, secured to said shafts, levers attached to said shafts radially, connecting arms pivoted to the levers identified with each of said apertures, connecting rods pivoted to said levers, and joined pivotally in such a manner that when one of said apertures is open the other is closed by said shutter sections, manual means for shifting said connecting rods to simultaneously cause rotation of said shutter sections, and at least one spring connected between the frame and at least one of said connecting rods in such a manner that the tension thereof is less when the shutter sections are open and closed than when they are in an intermediate position.

7. In a motion picture changeover system, two separate motion picture machines, a frame with an aperture in conjunction with each of said machines, shutter means supported over each of said apertures comprising complemental shutter sections adapted when moved together to close said apertures, and adapted to recede simultaneously from the closing position to open said apertures, means for simultaneously opening one of said apertures and closing the other, said means including shafts secured to said shutter sections, pivoted in said frame, a lever attached to each of said shafts radially and substantially parallel to each other lever, means for pivotally connecting the levers identified with each aperture, a pivoted manual control arm, and means for connecting said manual control arm and said means for connecting said levers, so that movement of said manual control arm is transferred to said connecting means for said levers, and including at least one spring connected between the frame and the said means for causing the sections to rotate, in such a manner that the tension thereof is less when the plates are in open and closed positions than when they are in an intermediate position.

8. In a changeover system, two separate motion picture machines, a frame with an aperture in conjunction with each of said machines, shutter means supported over each of said apertures comprising complemental shutter sections adapted when moved together to close said apertures, and adapted to recede simultaneously from the closing position to open said apertures, means for simultaneously opening one of said apertures and closing the other by means of said sections, including a manual control lever interconnecting the shutter sections of said machines, and means including at least one spring connected between said frame and said last mentioned means in such a manner that the tension thereof is less when said sections are in open and closed positions than when they are in an intermediate position.

9. In a motion picture changeover system, a pair of separate motion picture machines, each having a sound reproducing device, a frame having an aperture corresponding to each machine, shutter means supported over each of said apertures, capable of closing and opening said apertures, a lever secured to each of said shutter means, a universally pivoted manual lever, and rods connecting said manual lever and said levers secured to said shutter means in such a manner that when the manual lever is moved in one plane the said shutter means are actuated, a switch for effectuating a changeover from the sound reproducing device of one of said machines to the sound reproducing device of the other of said machines, and means for controlling the position of said switch by the movement of said manual control lever in another plane.

10. In a motion picture changeover system, a pair of separate motion picture machines, each having a sound reproducing device, shutter mechanisms associated with each of said machines, a manual control lever universally pivoted, means connected with said manual control lever for operating said shutter mechanisms by movement of the lever in one plane, a switch for effecting a changeover from the sound reproducing device of one of said machines to the sound reproducing device of the other of said machines, and means for controlling the position of said switch by movement of said manual control lever in another plane.

11. In a device of the class described, a frame section containing an aperture, shutter means supported over said aperture comprising complemental shutter sections possessing low moment of inertia and having circular recesses therein adapted when rotated in the same direction to close said aperture symmetrically, and adapted to recede simultaneously from the closing position symmetrically to open said aperture, means for rotating said shutter sections simultaneously in the same direction, said means including shafts secured to said shutter sections, pivoted in said frame section, a lever attached to each of said shafts radially and substantially parallel to each other, a link for pivotally connecting said levers, a pivoted manual control arm, and a connecting rod pivoted to said manual control arm and said link, so that movement of said manual control arm causes the simultaneous rotation of said shutter means.

12. In combination, in a device of the class described, a pair of separate motion picture machines, a frame with an aperture in conjunction with each of said machines, shutter means supported over each of said apertures comprising complemental shutter sections possessing low moment of inertia adapted when rotated in the same direction to close said apertures symmetrically, and adapted to recede simultaneously from the closing position symmetrically to open said apertures, and means for simultaneously opening one of said apertures and closing the other by rotating said shutter sections simultaneously in the same direction, said means including shafts secured to said shutter sections, pivoted in said frame section, a lever attached to each of said shafts radially and substantially parallel to each other, a link for pivotally connecting said levers, a pivoted manual control arm, and a connecting rod pivoted to said manual control arm and said link, so that movement of said manual control arm produces the simultaneous rotation of said shutter means.

ILO M. BROWN.